(12) United States Patent
Lucas et al.

(10) Patent No.: US 11,945,567 B2
(45) Date of Patent: Apr. 2, 2024

(54) FITTING FOR A STIFFENED PANEL

(71) Applicant: SAFRAN NACELLES LIMITED, Burnley (GB)

(72) Inventors: Scott Lucas, Burnley (GB); Geoffrey Aubert, Burnley (GB)

(73) Assignee: Safran Nacelles Limited, Burnley (GB)

( * ) Notice: Subject to any disclaimer, the term of this patent is extended or adjusted under 35 U.S.C. 154(b) by 997 days.

(21) Appl. No.: 16/630,041

(22) PCT Filed: Jul. 12, 2018

(86) PCT No.: PCT/GB2018/051985
§ 371 (c)(1),
(2) Date: Jan. 10, 2020

(87) PCT Pub. No.: WO2019/012286
PCT Pub. Date: Jan. 17, 2019

(65) Prior Publication Data
US 2021/0114709 A1    Apr. 22, 2021

(30) Foreign Application Priority Data

Jul. 12, 2017  (GB) ...................... 1711209

(51) Int. Cl.
*B64C 1/00* (2006.01)
*B64C 1/14* (2006.01)
(Continued)

(52) U.S. Cl.
CPC ............ *B64C 1/1461* (2013.01); *B64D 29/08* (2013.01); *F03D 80/88* (2016.05); *F16B 5/12* (2013.01); *F05D 2230/72* (2013.01)

(58) Field of Classification Search
CPC .... B63B 3/28; B63B 3/36; B64C 1/12; B64C 3/26; B64C 3/182; B64C 2001/0072;
(Continued)

(56) References Cited

U.S. PATENT DOCUMENTS

| 5,921,029 A | 7/1999 | Stuekerjuergen |
| 6,458,309 B1 * | 10/2002 | Allen ................. B29D 99/0014 156/197 |

(Continued)

FOREIGN PATENT DOCUMENTS

| CN | 103206150 | 3/2015 |
| EP | 1216816 | 6/2002 |

(Continued)

OTHER PUBLICATIONS

PCT/GB2018/051985—Notification of the Intl. Search Report and the Written Opinion of the Intl. Searching Authority; dated Oct. 2, 2018; 21 pages.

(Continued)

*Primary Examiner* — Chi Q Nguyen
(74) *Attorney, Agent, or Firm* — Tucker Ellis LLP

(57) ABSTRACT

A one-piece fitting (56) for a stiffened panel (51) comprising a panel body (52) with a plurality of stiffeners (53, 54, 55) arranged thereon, the fitting comprising a fitting body (56) configured to be fastened, in use, to two or more of the stiffeners (53, 54, 55) so as to provide a junction to transfer load between the two or more stiffeners, wherein the fitting body further comprises an integral functional fitting (57) arranged for engagement with a component other than the stiffened panel.

18 Claims, 9 Drawing Sheets

(51) Int. Cl.
  *B64D 29/08* (2006.01)
  *F03D 80/80* (2016.01)
  *F16B 5/12* (2006.01)

(58) Field of Classification Search
  CPC .......... B64C 2001/0081; F64C 1/1461; F64D 80/88; F64D 29/08; B61D 17/041; Y10T 29/49622; Y10T 29/53978; Y10T 29/49616; Y10T 428/24182; Y10T 428/24198; Y10T 428/24174; Y10T 428/24033; Y10T 156/1089; F16B 5/12; F05D 2230/72; F03D 80/88
  See application file for complete search history.

(56) References Cited

U.S. PATENT DOCUMENTS

| | | | | |
|---|---|---|---|---|
| 6,702,911 | B2* | 3/2004 | Toi | B64C 1/12 264/258 |
| 7,134,629 | B2* | 11/2006 | Johnson | B63B 3/28 244/119 |
| 7,686,251 | B2* | 3/2010 | Tanner | B64C 3/26 244/123.1 |
| 11,524,761 | B2* | 12/2022 | Dopker | B64C 1/061 |
| 2005/0003145 | A1* | 1/2005 | Toi | B29C 70/443 428/102 |
| 2005/0263645 | A1* | 12/2005 | Johnson | B63B 3/36 244/119 |
| 2006/0226287 | A1* | 10/2006 | Grantham | B64C 5/06 244/119 |
| 2008/0307739 | A1* | 12/2008 | Clucas | E04B 1/24 52/580 |
| 2012/0060938 | A1 | 3/2012 | Chelin | |
| 2013/0089712 | A1* | 4/2013 | Kwon | B64C 1/12 428/174 |
| 2015/0083861 | A1* | 3/2015 | Alby | B64C 1/061 244/119 |
| 2017/0001707 | A1* | 1/2017 | Charles | B64C 3/182 |
| 2022/0017205 | A1* | 1/2022 | Vingiani | B64F 5/10 |

FOREIGN PATENT DOCUMENTS

| | | |
|---|---|---|
| EP | 2554471 | 2/2013 |
| EP | 3403918 | 11/2018 |
| JP | 11115598 | 4/1999 |
| JP | 2000336880 | 12/2000 |
| WO | 2010115853 | 10/2010 |
| WO | 2016191510 | 12/2016 |

OTHER PUBLICATIONS

IPO Search Report; dated Jan. 29, 2019; GB1711209.5; 4 pages.

* cited by examiner

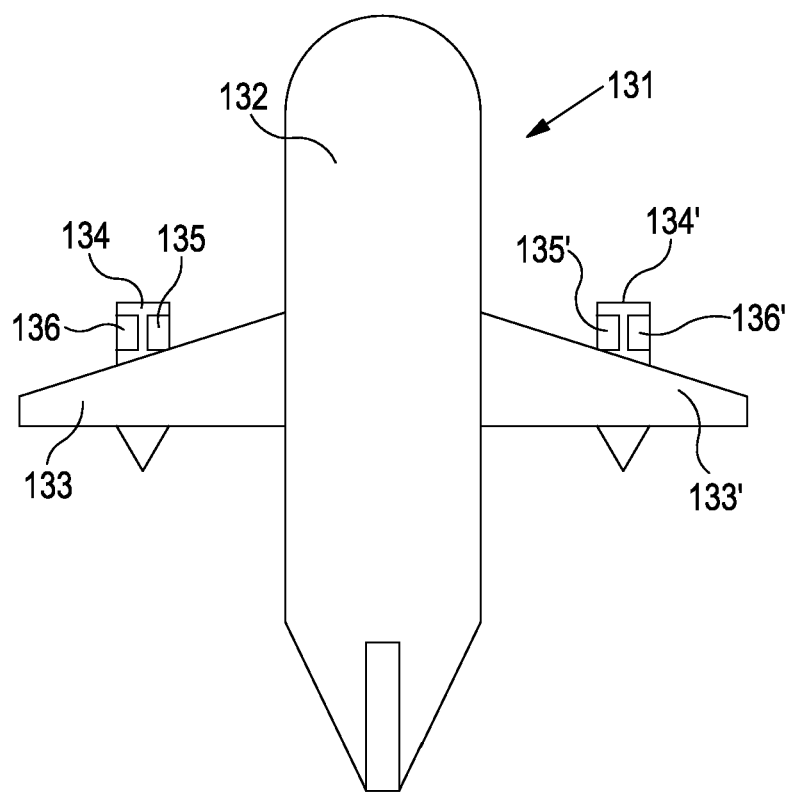
Figure 13
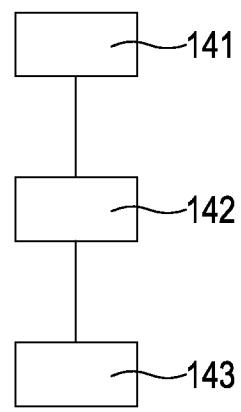
Figure 14
144
Figure 15

FITTING FOR A STIFFENED PANEL

RELATED APPLICATION DATA

This application is a national phase application of International Application No. PCT/GB2018/051985 filed Jul. 12, 2018, published in the English language, and which claims priority to application number GB 1711209.5 filed Jul. 12, 2017. The entireties of the aforementioned applications are incorporated herein by reference.

The present invention relates to a fitting for a stiffened panel. The invention also relates to stiffened panels.

Further, the invention relates to the manufacture and/or assembly of a fitting for a stiffened panel and the manufacture and/or assembly of a stiffened panel.

Stiffened panels are used in many industries, including the aerospace industry.

For example, in aircraft nacelles, fan cowl doors typically comprise a stiffened panel. In a fan cowl door, the stiffened panel comprises a curved panel body with stiffeners arranged thereon. The panel body may be made from a composite material. The stiffeners comprise elongate members and typically may be arranged circumferentially and longitudinally. The stiffeners may be made from a metal or a composite material.

Where stiffeners, e.g. a longitudinal and a circumferential stiffener, meet, a fitting is fastened to the stiffeners to provide a junction to transfer load between the stiffeners. A mechanical fitting can then be fastened to the fitting, the mechanical fitting being arranged to engage mechanically with a component other than the stiffened panel. The mechanical fitting may be for example a latch fitting or a hinge fitting.

This arrangement, with a fitting fastened to the stiffeners to transfer load between the stiffeners and a separate mechanical fitting fastened to the fitting, is not weight efficient. Weight efficiency can be a particularly important consideration in, for example, aerospace applications.

Furthermore, the arrangement may be relatively complex and time-consuming to assemble.

Another problem occurs when composite stiffeners are used in that it is generally difficult to achieve good composite quality in tight corners at stiffener junctions. Accordingly, the structural integrity and mechanical performance of the stiffened panel may be compromised and/or a significant proportion of stiffener junctions may be rejected during manufacture and/or assembly of the stiffened panel.

A first aspect of the invention provides a one-piece fitting for a stiffened panel comprising a panel body with a plurality of stiffeners arranged thereon, the fitting comprising a fitting body configured to be fastened, in use, to two or more of the stiffeners so as to provide a junction to transfer load between the two or more stiffeners, wherein the fitting body further comprises an integral functional fitting arranged for engagement with a component other than the stiffened panel.

Advantageously, the one-piece fitting performs, in use, two functions: load transfer between the two or more stiffeners; and engagement with a component other than the stiffened panel. Thus, the one-piece fitting may be particularly weight efficient, which can be an important consideration in many applications, e.g. aerospace applications.

In an embodiment, the fitting body may be made from a metal or a composite material. For instance the fitting may comprise, or consist essentially of, aluminium, an aluminium alloy, an aluminium-lithium alloy, a nickel alloy, stainless steel, a magnesium alloy, titanium, a carbon fibre composite. The composite material may be a resin transfer moulded (RTM) composite.

The fitting body may be made by any suitable manufacturing and/or forming process. In an embodiment, the fitting may be made by an additive manufacturing process, e.g. 3D printing or selective laser melting or selective laser sintering.

In an embodiment, the fitting body may be configured to be fastened to two, three, four, five, six, seven, eight, nine or ten stiffeners.

In an embodiment, the fitting body may comprise a plurality of holes for receiving mechanical fastening means, e.g. screws. Additionally or alternatively, the fitting body may be adapted to be bonded, e.g. adhered, in use, to a substrate, e.g. the stiffeners and/or the panel body.

In an embodiment, the integral functional fitting may comprise a mechanical fitting arranged for mechanical engagement with a component other than the stiffened panel. For instance, the integral functional fitting may comprise a hook, a hinge fitting, a latch fitting, a hoist fitting, a hold-open-rod fitting. The hinge fitting may comprise a gooseneck-type hinge fitting, a blade-type hinge fitting or a hook-type hinge fitting.

In an embodiment, the integral functional fitting may comprise a magnetic fitting arranged for magnetic engagement with a component other than the stiffened panel.

In an embodiment, the fitting body may comprise a recessed portion configured to be located, in use, in a gap between the two or more stiffeners. The integral functional fitting may be disposed at least partially within the recessed portion. Thus, the one-piece fitting may be relatively compact.

A second aspect of the invention provides a stiffened panel comprising: a panel body; a plurality of stiffeners arranged on the panel body; and a one-piece fitting comprising a fitting body fastened to two or more of the stiffeners, whereby the fitting body provides, in use a junction to transfer load between the two or more stiffeners, wherein the fitting body further comprises an integral functional fitting for engagement with a component other than the stiffened panel.

Advantageously, the one-piece fitting performs, in use, two functions: load transfer between the two or more stiffeners; and engagement with a component other than the stiffened panel. Thus, a stiffened panel comprising the one-piece fitting may be particularly weight efficient, which can be an important consideration in many applications, e.g. aerospace applications.

Advantageously, by providing the one-piece fitting that performs, in use, two functions, the manufacture and/or assembly of the stiffened panel may be simplified.

In an embodiment, the integral functional fitting may comprise a mechanical fitting arranged for mechanical engagement with a component other than the stiffened panel. For instance, the integral functional fitting may comprise a hook, a hinge fitting, a latch fitting, a hoist fitting, a hold-open-rod fitting. The hinge fitting may comprise a gooseneck-type hinge fitting, a blade-type hinge fitting or a hook-type hinge fitting.

In an embodiment, the integral functional fitting may comprise a magnetic fitting arranged for magnetic engagement with a component other than the stiffened panel.

In an embodiment, the panel body may be substantially monolithic.

In an embodiment, the panel body may be curved in at least one direction.

In an embodiment, the or each stiffener may be hollow. Alternatively, the or each stiffener may comprise an outer skin and a reinforcing core, e.g. a foam or honeycomb core.

In an embodiment, the fitting body may be fastened to two, three, four, five, six, seven, eight, nine or 10 stiffeners.

The panel body may for instance comprise, or consist essentially of, a metal or a composite material.

The or each stiffener may comprise, or consist essentially of, a metal or a composite material.

In an embodiment, one or more, e.g. all, of the stiffeners may be formed integrally with the panel body. For instance, the one or more stiffeners and the panel body may be made using a one-shot manufacturing process such as resin infusion (or vacuum infusion).

Advantageously, forming one or more of the stiffeners integrally with the panel body, e.g. using a one-shot manufacturing process, may simplify and/or speed up the manufacture and/or assembly of the stiffened panel.

In an embodiment, the stiffened panel may comprise an access panel.

In an embodiment, the stiffened panel may be an access panel, e.g. a fan cowl door for an aircraft nacelle.

In an embodiment, the fitting body may span a gap between the two or more stiffeners.

Advantageously, the one-piece fitting may be used to provide a junction between two or more stiffeners having a gap between them. Accordingly, the stiffened panel may be relatively weight efficient, since there is no mechanically or structurally redundant stiffener material in the gap spanned by the fitting body.

Further, in manufacturing the stiffened panel there may be less need, even no need, to form stiffener junctions. Thus, the problem of poor composite quality in tight corners at stiffener junctions may be avoided.

The fitting body may comprise a recessed portion configured to be located, in use, in the gap between the two or more stiffeners. The integral functional fitting may be disposed at least partially within the recessed portion. Thus, the one-piece fitting may be relatively compact.

A third aspect of the invention provides a stiffened panel comprising: a panel body; a plurality of stiffeners arranged on the panel body; and a one-piece fitting comprising a fitting body fastened to two or more of the stiffeners, there being a gap between the two or more stiffeners, whereby the fitting body spans the gap and provides, in use, a junction to transfer load between the two or more stiffeners.

Advantageously, the stiffened panel may be relatively weight efficient, since there is no mechanically or structurally redundant stiffener material in the gap spanned by the fitting body.

Further, in manufacturing the stiffened panel there may be less need, even no need, to form stiffener junctions. Thus, the problem of poor composite quality in tight corners at stiffener junctions may be avoided.

In an embodiment, the fitting body may further comprise an integral functional fitting for engagement with a component other than the stiffened panel.

In an embodiment, the integral functional fitting may comprise a mechanical fitting arranged for mechanical engagement with a component other than the stiffened panel. For instance, the integral functional fitting may comprise a hook, a hinge fitting, a latch fitting, a hoist fitting, a hold-open-rod fitting. The hinge fitting may comprise a gooseneck-type hinge fitting, a blade-type hinge fitting or a hook-type hinge fitting.

In an embodiment, the integral functional fitting may comprise a magnetic fitting arranged for magnetic engagement with a component other than the stiffened panel.

Advantageously, the one-piece fitting may perform, in use, two functions: load transfer between the two or more stiffeners; and engagement with a component other than the stiffened panel. Thus, a stiffened panel comprising the one-piece fitting comprising an integral functional fitting may be particularly weight efficient, which can be an important consideration in many applications, e.g. aerospace applications.

Advantageously, by providing the one-piece fitting that performs, in use, two functions, the manufacture and/or assembly of the stiffened panel may be simplified.

In an embodiment, the panel body may be substantially monolithic.

In an embodiment, the panel body may be curved in at least one direction.

In an embodiment, the or each stiffener may be hollow. Alternatively, the or each stiffener may comprise an outer skin and a reinforcing core, e.g. a foam or honeycomb core.

In an embodiment, the fitting body may be fastened to two, three, four, five, six, seven, eight, nine or 10 stiffeners.

The panel body may for instance comprise, or consist essentially of, a composite material.

The or each stiffener may comprise, or consist essentially of, a metal or a composite material.

In an embodiment, one or more, e.g. all, of the stiffeners may be formed integrally with the panel body. For instance, the one or more stiffeners and the panel body may be made using a one-shot manufacturing process such as resin infusion (or vacuum infusion).

Advantageously, forming one or more of the stiffeners integrally with the panel body, e.g. using a one-shot manufacturing process, may simplify and/or speed up the manufacture and/or assembly of the stiffened panel.

In an embodiment, the stiffened panel may comprise an access panel.

In an embodiment, the stiffened panel may be an access panel, e.g. a fan cowl door for an aircraft nacelle.

The fitting body may comprise a recessed portion configured to be located, in use, in the gap between the two or more stiffeners. The or an integral functional fitting may be disposed at least partially within the recessed portion. Thus, the one-piece fitting may be relatively compact.

A fourth aspect of the invention provides a stiffened panel comprising a panel body and one or more stiffeners arranged thereon, wherein the stiffener(s) and the panel body are integrally formed.

In embodiments, the stiffener(s) may be hollow.

For example, the panel body and/or the stiffener(s) may comprise, or consist essentially of, a composite material or a metal.

In embodiments, more than one stiffener may be integrally formed with the panel body and there may be a gap between two or more of the stiffeners.

A fifth aspect of the invention provides a nacelle, e.g. for an aircraft or a wind turbine, comprising a stiffened panel according to the second aspect of the invention or the third aspect of the invention or the fourth aspect of the invention.

The nacelle may be configured to house an aircraft engine, e.g. a turboprop or a turbofan aircraft engine.

A sixth aspect of the invention provides a structure comprising a stiffened panel according to the second aspect of the invention or the third aspect of the invention or the fourth aspect of the invention.

The stiffened panel may comprise an access panel.

The structure may comprise a building or a vehicle. The building may be a permanent, semi-permanent or temporary building. The vehicle may be a spacecraft, an aircraft, a boat, a rail engine or item of rolling stock, or an automobile, e.g. a car, bus or lorry or other on- and/or off-road vehicle.

The invention further provides a kit of parts arranged to be assembled to form a stiffened panel as described herein. The kit of parts may comprise at least one one-piece fitting according to the invention, a panel body and at least two stiffeners. The panel body and one or more of the at least two stiffeners may be integrally formed.

Another aspect of the invention provides a method of manufacture or assembly of a stiffened panel comprising: providing a panel body with a plurality of stiffeners arranged thereon; providing a one-piece fitting comprising a fitting body configured to be fastened, in use, to two or more of the stiffeners, wherein the fitting body further comprises an integral functional fitting arranged for engagement with a component other than the stiffened panel; fastening the fitting body to two or more of the stiffeners so as to provide a junction to transfer load between the two or more stiffeners.

Another aspect of the invention provides a method of manufacture or assembly of a stiffened panel comprising: providing a panel body with a plurality of stiffeners arranged thereon, there being a gap between two or more of the stiffeners; providing a one-piece fitting comprising a fitting body configured to be fastened, in use, to the two or more of the stiffeners; fastening the fitting body to the two or more stiffeners such that the fitting body spans the gap and provides, in use, a junction to transfer load between the two or more stiffeners.

The method may comprise the step of arranging the stiffeners on the panel body.

Optionally, the method may comprise the step of forming one or more, e.g. all, of the stiffeners integrally with the panel body. For instance, the one or more stiffeners and the panel body may be made using a one-shot manufacturing process such as resin infusion (or vacuum infusion).

Another aspect of the invention provides a method of manufacture of a stiffened panel comprising forming one or more stiffeners integrally with a panel body.

For instance, the one or more stiffeners and the panel body may be made using a one-shot manufacturing process such as resin infusion (or vacuum infusion).

In embodiments, the stiffener(s) may be hollow.

For example, the panel body and/or the stiffener(s) may comprise, or consist essentially of, a composite material or a metal.

In embodiments, more than one stiffener may be integrally formed with the panel body and there may be a gap between two or more of the stiffeners.

A further aspect of the invention provides a computer-readable medium carrying instructions for the manufacture of a one-piece fitting according to the invention and/or at least part of a stiffened panel according to the invention. In an embodiment, the instructions may be executable in an additive manufacturing process. For instance, the instructions may be executable in a three-dimensional (3D) printer.

In order that the invention can be well understood, it will now be described by way of example only with reference to the accompanying drawings, in which:

FIG. 10 shows another example of a portion of a stiffened panel with a fitting according to the invention;

FIG. 11 shows an example of portion of two connected stiffened panels with fittings according to the invention;

FIG. 13 shows another an aircraft comprising a plurality of stiffened panels according to the invention; and FIG. 14 is a flow chart illustrating an example embodiment of a method of manufacture according to the invention.

FIG. 15 is a schematic drawing illustrating an exemplary computer-readable medium.

Figure 1:
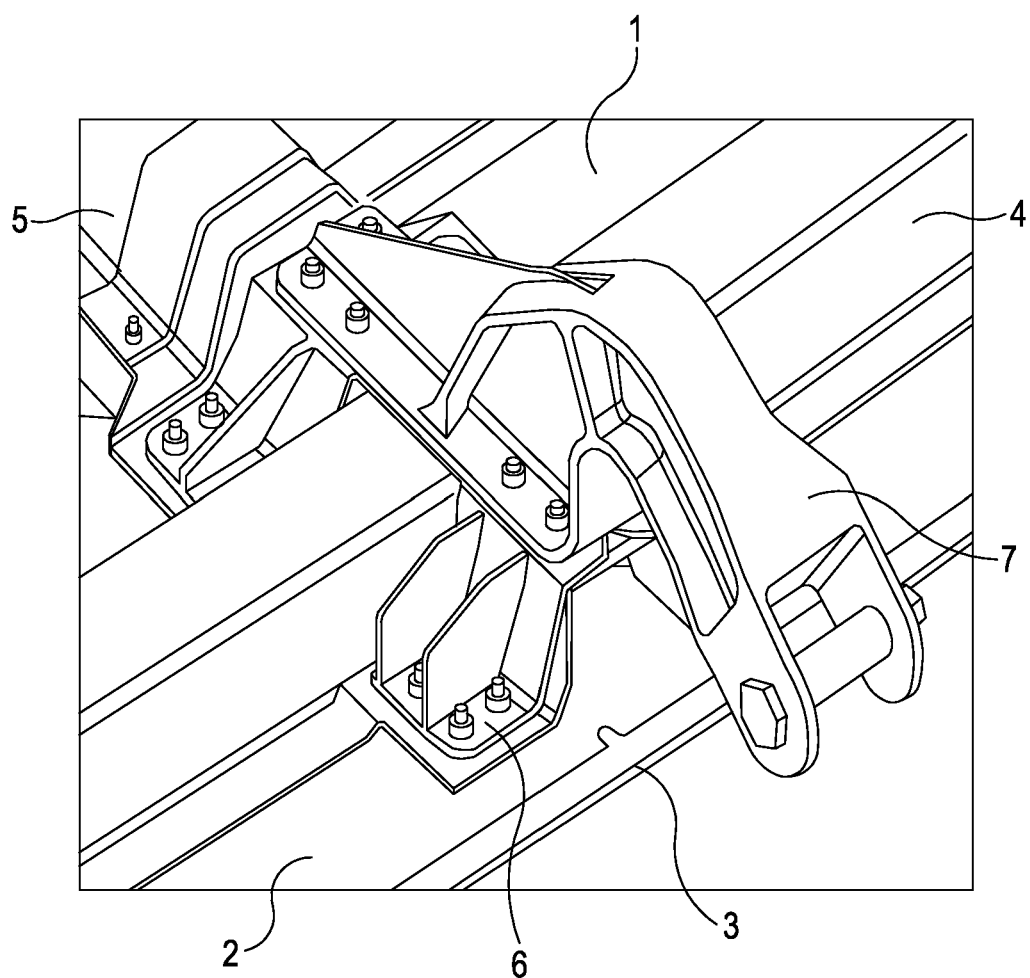
FIG. 1 shows an example of a portion of a prior art fan cowl door.

FIG. 1 shows an example of a portion of a prior art fan cowl door 1. The fan cowl door 1 comprises a composite panel body 2. In FIG. 1, a longitudinally extending edge 3 of the composite panel body 2 is shown. Attached to the panel body 2 and running parallel to the edge 3 is a longitudinal stiffener 4. The longitudinal stiffener 4 has a top hat or omega cross-section. A circumferential stiffener 5 is attached to the panel body 2 and terminates at one end adjacent the longitudinal stiffener 4. The circumferential stiffener 5 has a top hat or omega cross-section. A first fitting 6 is fastened mechanically to the longitudinal stiffener 4 and the circumferential stiffener 5 to form a junction to transfer load between them. On top of the first fitting 6 is fastened a second fitting 7, which comprises a gooseneck-type hinge fitting. The hinge fitting extends beyond the edge 3 of the composite panel body 2. The hinge fitting is attachable, in use, to another component part of the nacelle.

Figure 2:
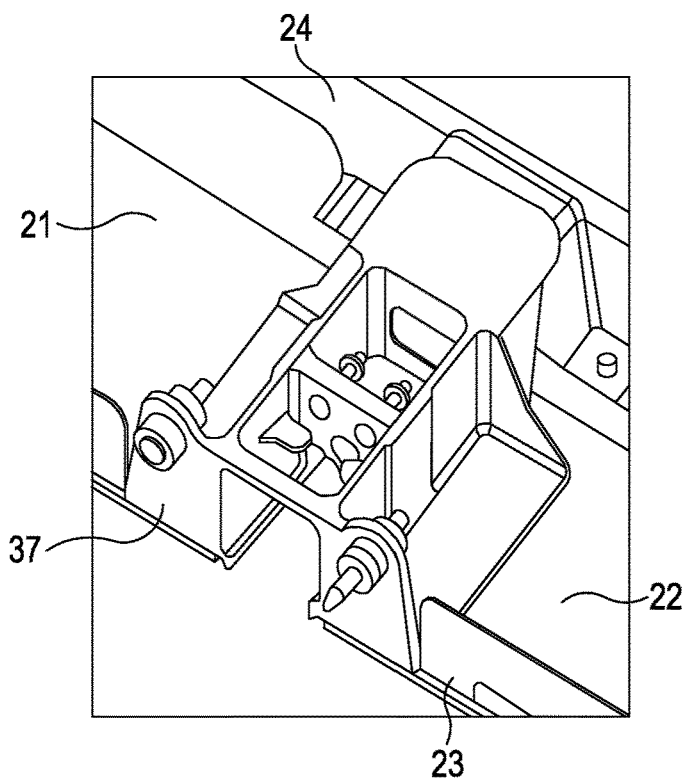
FIG. 2 shows another example of a portion of a prior art fan cowl door.

FIG. 2 shows a portion of another example of a prior art fan cowl door 21. The fan cowl door 21 comprises a composite panel body 22. In FIG. 2, a longitudinally extending edge 23 of the composite panel body 22 is shown. Attached to the panel body 22 and running parallel to the edge 23 is a longitudinal stiffener 24. The longitudinal stiffener 24 has a top hat or omega cross-section. A circumferential stiffener (not shown) is attached to the panel body 22 and terminates at one end adjacent the longitudinal stiffener 24. A fitting 27, which comprises a latch fitting, is fastened mechanically to the longitudinal stiffener 24. The fitting 27 extends from the longitudinal stiffener 24 to the edge 23 of the composite panel body 22. The latch fitting extends beyond the edge 23 of the composite panel body 22. The latch fitting engages, in use, with another component part of the nacelle.

The prior art fan cowl doors illustrated in FIG. 1 and FIG. 2 are not particularly weight efficient and/or may be relatively complex to manufacture and/or assemble.

A further disadvantage of the prior art fan cowl door illustrated in FIG. 2 is that it is not possible to locate the stiffeners closer to the edge of the panel body, because of the position and size of the latch fitting.

Figure 3:
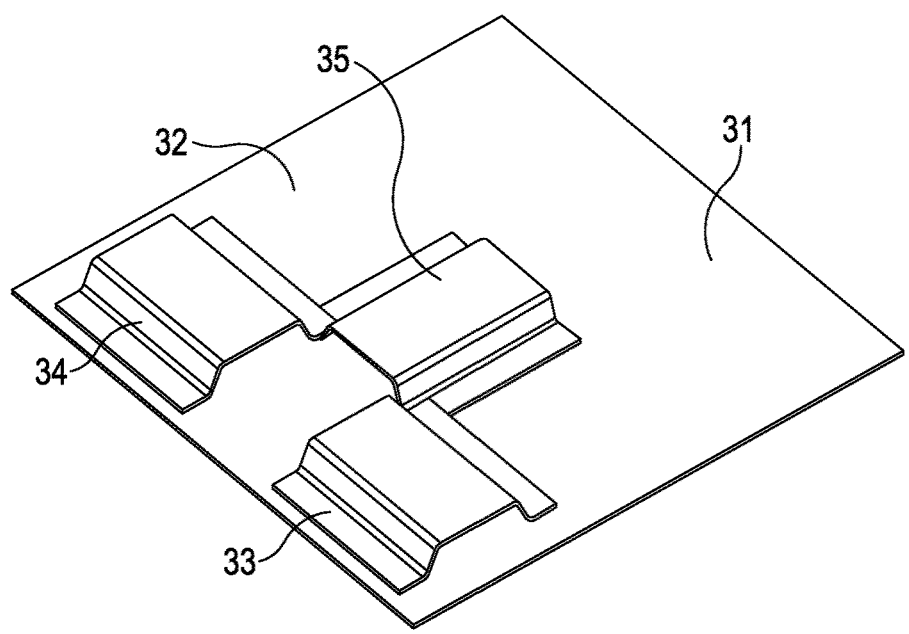
FIG. 3 shows a portion of a stiffened panel according to the invention.

FIG. 3 shows a portion of a stiffened panel 31, which could for example be part of a fan cowl door. The stiffened panel 31 comprises a panel body 32 made from a composite material. A first stiffener 33, a second stiffener 34 and a third stiffener 35 are arranged on the panel body 32. The first stiffener 33 and the second stiffener 34 are aligned with each other and there is a gap between the first stiffener 33 and the second stiffener 34. The third stiffener 35 is aligned perpendicularly to the first stiffener 33 and the second stiffener 34. The third stiffener 35 terminates at one end at the gap between the first stiffener 33 and the second stiffener 34.

The first stiffener 33, the second stiffener 34 and the third stiffener 35 are hollow and have a top hat or omega cross-section. The stiffeners 33, 34, 35 could be attached to the panel body 32 by any suitable means, e.g. using a bonding technique or mechanical fasteners. The stiffeners 33, 34, 35 may be made from a composite material.

In an embodiment, the stiffeners 33, 34, 35 may be hollow and made from a composite material and/or may be formed integrally with the panel body 32. Advantageously, a one-shot manufacturing process may be used to make the stiffened panel 31 comprising the panel body 32 and integrally formed stiffeners 33, 34, 35. Resin infusion (or vacuum infusion) may be a suitable one-shot manufacturing process.

Figure 4:
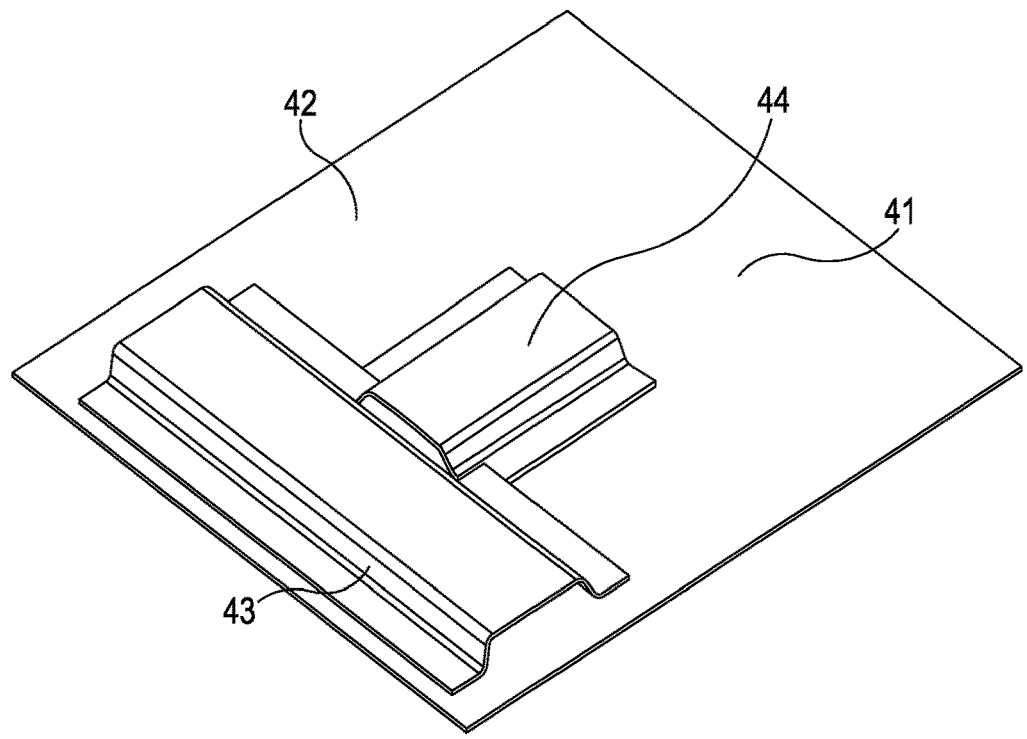
FIG. 4 shows another example of a portion of a stiffened panel according to the invention.

FIG. 4 shows a portion of a stiffened panel 41, which could for example be part of a fan cowl door. The stiffened panel 41 comprises a panel body 42 made from a composite material. A first stiffener 43 and a second stiffener 44 are arranged on the panel body 42. The second stiffener 44 is aligned perpendicularly to the first stiffener 43. An end of the second stiffener 44 meets the first stiffener 43.

The first stiffener 43 and the second stiffener 44 are hollow and have a top hat or omega cross-section. The stiffeners 43, 44 could be attached to the panel body 42 by any suitable means, e.g. using a bonding technique or mechanical fasteners. The stiffeners 43, 44 may be made from a composite material.

In an embodiment, the stiffeners 43, 44 may be hollow and made from a composite material and/or may be formed integrally with the panel body 42. Advantageously, a one-shot manufacturing process may be used to make the stiffened panel 41 comprising the panel body 42 and integrally formed stiffeners 43, 44. Resin infusion (or vacuum infusion) may be a suitable one-shot manufacturing process.

Figure 5:
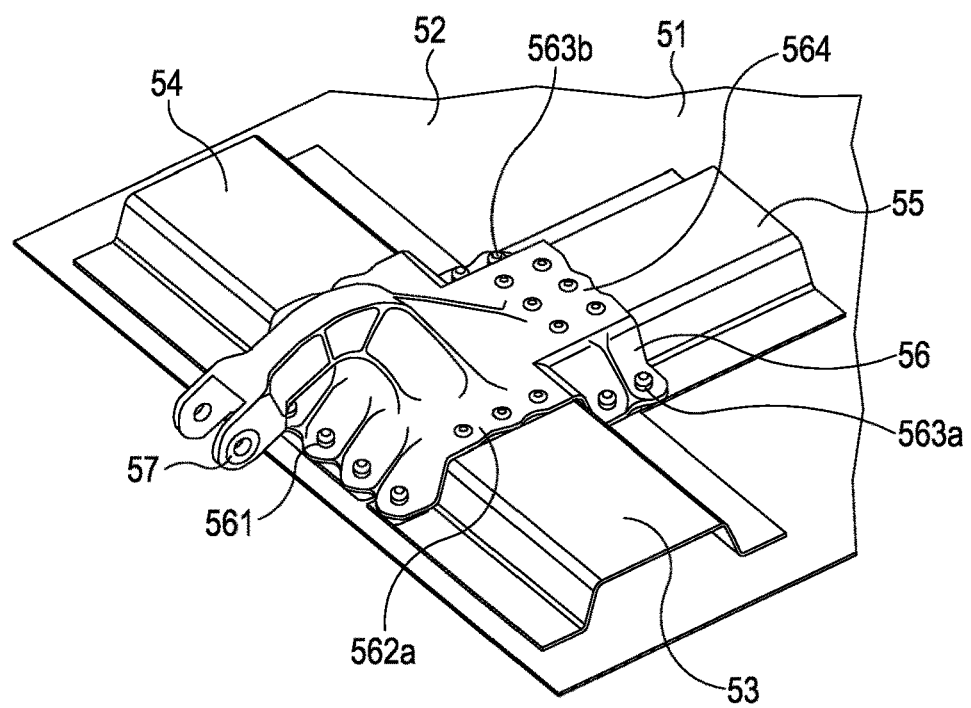
FIG. 5 shows an example of a portion of a stiffened panel with a fitting according to the invention.

FIG. 5 shows a portion of a stiffened panel 51, which could for example be part of a fan cowl door. The stiffened panel 51 comprises a panel body 52 made from a composite material. A first stiffener 53, a second stiffener 54 and a third stiffener 55 are arranged on the panel body 52. The first stiffener 53 and the second stiffener 54 are aligned with each other and there is a gap between the first stiffener 53 and the second stiffener 54. The third stiffener 55 is aligned perpendicularly to the first stiffener 53 and the second stiffener 54. The third stiffener 55 terminates at one end at the gap between the first stiffener 53 and the second stiffener 54.

The first stiffener 53, the second stiffener 54 and the third stiffener 55 are hollow and have a top hat or omega cross-section. The stiffeners 53, 54, 55 could be attached to the panel body 52 by any suitable means, e.g. using a bonding technique or mechanical fasteners. The stiffeners 53, 54, 55 may be made from a composite material.

In an embodiment, the stiffeners 53, 54, 55 may be hollow and made from a composite material and/or may be formed integrally with the panel body 52. Advantageously, a one-shot manufacturing process may be used to make the stiffened panel 51 comprising the panel body 52 and integrally formed stiffeners 53, 54, 55. Resin infusion (or vacuum infusion) may be a suitable one-shot manufacturing process.

A fitting comprises a body 56, which is fastened to the first stiffener 53, the second stiffener 54 and the third stiffener 55. Accordingly, the body 56 provides a junction to transfer load, in use, between the first, second and third stiffeners 53, 54, 55. The body 56 also comprises an integral hinge fitting 57 in the form of a gooseneck. The integral hinge fitting 57 is arranged such that it extends beyond an edge of the panel body 52.

The body 56 covers the gap between the first, second and third stiffeners 53, 54, 55 and overlaps end portions of each of the first, second and third stiffeners 53, 54, 55. The body 56 is shaped and dimensioned to match substantially the profiles of the first, second and third stiffeners 53, 54, 55. Accordingly, the body 56 covers the gap and fits relatively snugly over the end portions of the first, second and third stiffeners 53, 54, 55.

The body 56 is fastened to the stiffeners 53, 54, 55 and/or the panel body 52 by a plurality of mechanical fasteners.

A first array 561 of mechanical fasteners comprises a row of five mechanical fasteners, which are arranged such that: a first end fastener fastens the body 56 to a flange of the first stiffener 53 (and the panel body 52 beneath the first stiffener 53); the three middle fasteners fasten the body 56 to the panel body 52 in the gap between the first stiffener 53 and the second stiffener 54; and a second end fastener fastens the body 56 to a flange of the second stiffener 54 (and the panel body 52 beneath the second stiffener 54).

A second array 562*a* of mechanical fasteners comprises a row of three mechanical fasteners, which fasten the body 56 to a raised central portion of the first stiffener 53. The row of mechanical fasteners in the second array 562*a* extends in a transverse direction across the first stiffener 53.

A third array 562*b* of mechanical fasteners comprises a row of three mechanical fasteners, which fasten the body 56 to a raised central portion of the second stiffener 54. The row of mechanical fasteners in the third array 562*b* extends in a transverse direction across the second stiffener 54.

A fourth array 563*a* of mechanical fasteners comprises two mechanical fasteners. One of the mechanical fasteners in the fourth array 563*a* fastens the body 56 to a flange of the first stiffener 53 and the other fastens the body 56 to a flange of the third stiffener 55. In an embodiment, the flange of the first stiffener 53 and the flange of the third stiffener 55 may overlap one another, with either one on top of the other, in which case the mechanical fasteners in the fourth array 563*a* may each fasten the body 56 to the flange of the first stiffener 53 and to the flange of the third stiffener 55.

A fifth array 563*b* of mechanical fasteners comprises two mechanical fasteners. One of the mechanical fasteners in the fifth array 563*b* fastens the body 56 to a flange of the second stiffener 54 and the other fastens the body 56 to a flange of the third stiffener 55. In an embodiment, the flange of the second stiffener 54 and the flange of the third stiffener 55 may overlap one another, with either one on top of the other, in which case the mechanical fasteners in the fifth array 563*b* may each fasten the body 56 to the flange of the second stiffener 54 and to the flange of the third stiffener 55.

A sixth array 564 of mechanical fasteners comprises two rows of three mechanical fasteners, which fasten the body 56 to a raised central portion of third stiffener 55. The two rows of mechanical fasteners in the sixth array 564 extend in a transverse direction across the third stiffener 55.

Figure 6:
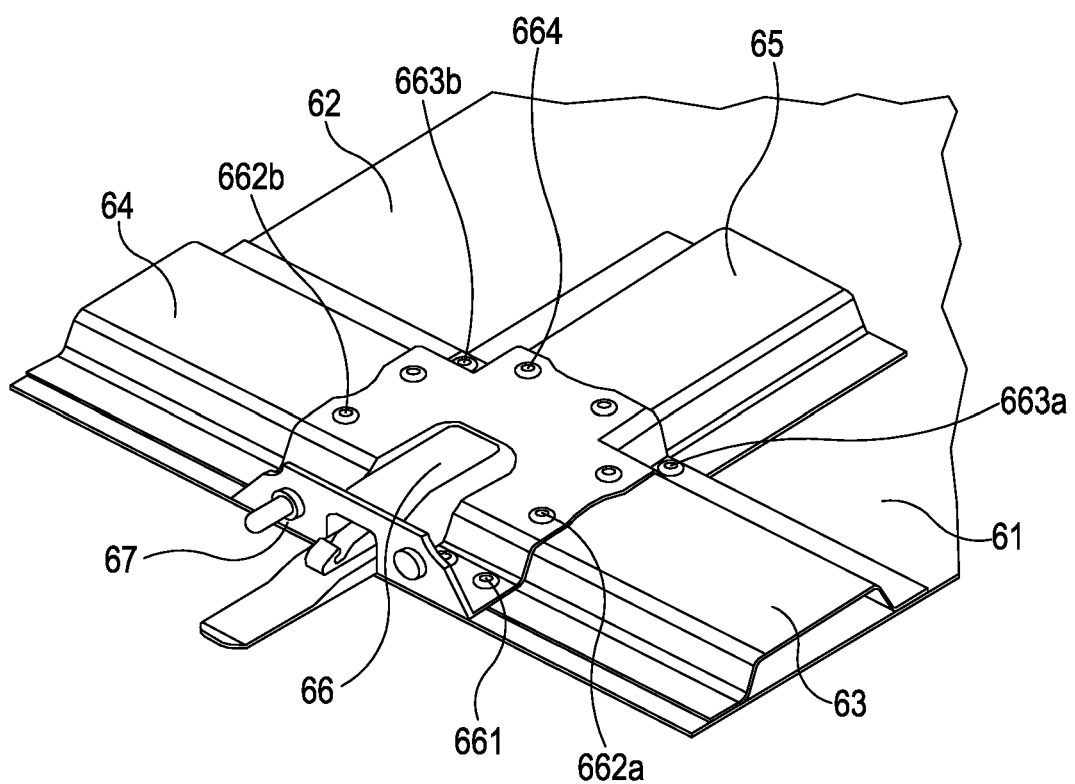
FIG. 6 shows another example of a portion of a stiffened panel with a fitting according to the invention.

FIG. 6 shows a portion of a stiffened panel 61, which could for example be part of a fan cowl door. The stiffened panel 61 comprises a panel body 62 made from a composite material. A first stiffener 63, a second stiffener 64 and a third stiffener 65 are arranged on the panel body 62. The first stiffener 63 and the second stiffener 64 are aligned with each other and there is a gap between the first stiffener 63 and the second stiffener 64. The third stiffener 65 is aligned perpendicularly to the first stiffener 63 and the second stiffener 64.

The third stiffener 65 terminates at one end at the gap between the first stiffener 63 and the second stiffener 64.

The first stiffener 63, second stiffener 64 and the third stiffener 65 are hollow and have a top hat or omega cross-section. The stiffeners 63, 64, 65 could be attached to the panel body 62 by any suitable means, e.g. using a bonding technique or mechanical fasteners. The stiffeners 63, 64, 65 may be made from a composite material.

In an embodiment, the stiffeners 63, 64, 65 may be hollow and made from a composite material and/or may be formed integrally with the panel body 62. Advantageously, a one-shot manufacturing process may be used to make the stiffened panel 61 comprising the panel body 62 and integrally formed stiffeners 63, 64, 65. Resin infusion (or vacuum infusion) may be a suitable one-shot manufacturing process.

A fitting comprises a body 66, which is fastened to the first stiffener 63, the second stiffener 64 and the third stiffener 65. Accordingly, the body 66 provides a junction to transfer load, in use, between the first, second and third stiffeners 63, 64, 65. The body 66 also comprises an integral latch fitting 67. The integral latch fitting 67 is arranged such that it extends beyond an edge of the panel body 62.

The body 66 covers the gap between the first, second and third stiffeners 63, 64, 65 and overlaps end portions of each of the first, second and third stiffeners 63, 64, 65. The body 66 is shaped and dimensioned to match substantially the profiles of the first, second and third stiffeners 63, 64, 65. Accordingly, the body 66 covers the gap and fits relatively snugly over the end portions of the first, second and third stiffeners 63, 64, 65.

The body 66 is fastened to the stiffeners 63, 64, 65 and/or the panel body 62 by a plurality of mechanical fasteners.

A first array 661 of mechanical fasteners comprises a row of four mechanical fasteners comprising two groups of two fasteners either side of a central portion of the latch fitting 67. One of the groups of two fasteners is arranged such that a first fastener fastens the body 66 to a flange of the first stiffener 63 (and the panel body 62 beneath the first stiffener 63) and a second fastener fastens the body 66 to the panel body 62 in the gap between the first stiffener 63 and the second stiffener 64; the other of the groups of two fasteners is arranged such that a first fastener fastens the body 66 to a flange of the second stiffener 64 (and the panel body 62 beneath the second stiffener 64) and a second fastener fastens the body 66 to the panel body 62 in the gap between the first stiffener 63 and the second stiffener 64.

A second array 662a of mechanical fasteners comprises a row of two mechanical fasteners, which fasten the body 66 to a raised central portion of the first stiffener 63. The row of mechanical fasteners in the second array 662a extends in a transverse direction across the first stiffener 63.

A third array 662b of mechanical fasteners comprises a row of two mechanical fasteners, which fasten the body 66 to a raised central portion of the second stiffener 64. The row of mechanical fasteners in the third array 662b extends in a transverse direction across the second stiffener 64.

A fourth array 663a of mechanical fasteners comprises one mechanical fastener. The mechanical fastener in the fourth array 663a fastens the body 66 to a flange of the first stiffener 63. In an embodiment, the mechanical fastener in the fourth array 663a may fasten the body 66 to a flange of the third stiffener 65. In an embodiment, the flange of the first stiffener 63 and the flange of the third stiffener 65 may overlap one another, with either one on top of the other, in which case the mechanical fastener in the fourth array 663a may fasten the body 66 to the flange of the first stiffener 63 and to the flange of the third stiffener 65.

A fifth array 663b of mechanical fasteners comprises a mechanical fastener. The mechanical fastener in the fifth array 663b fastens the body 66 to a flange of the second stiffener 64. In an embodiment, the mechanical fastener in the fifth array 663b may fasten the body 66 to a flange of the third stiffener 65. In an embodiment, the flange of the second stiffener 64 and the flange of the third stiffener 65 may overlap one another, with either one on top of the other, in which case the mechanical fastener in the fifth array 663b may fasten the body 66 to the flange of the second stiffener 64 and to the flange of the third stiffener 65.

A sixth array 664 of mechanical fasteners comprises a row of two mechanical fasteners, which fasten the body 66 to a raised central portion of third stiffener 65.

The row of mechanical fasteners in the sixth array 664 extends in a transverse direction across the third stiffener 65.

By providing a one-piece fitting comprising an integral latch fitting (e.g. as illustrated in FIG. 6), it may be possible to locate at least one stiffener relatively close to the edge of the panel body. Generally, structural integrity of the stiffened panel may be improved when the stiffener(s) is/are located relatively close to the edge(s) of the panel body. Advantageously, the stiffener(s) may extend substantially parallel to the edge of the panel body (e.g. as illustrated in FIG. 6).

Figure 7:
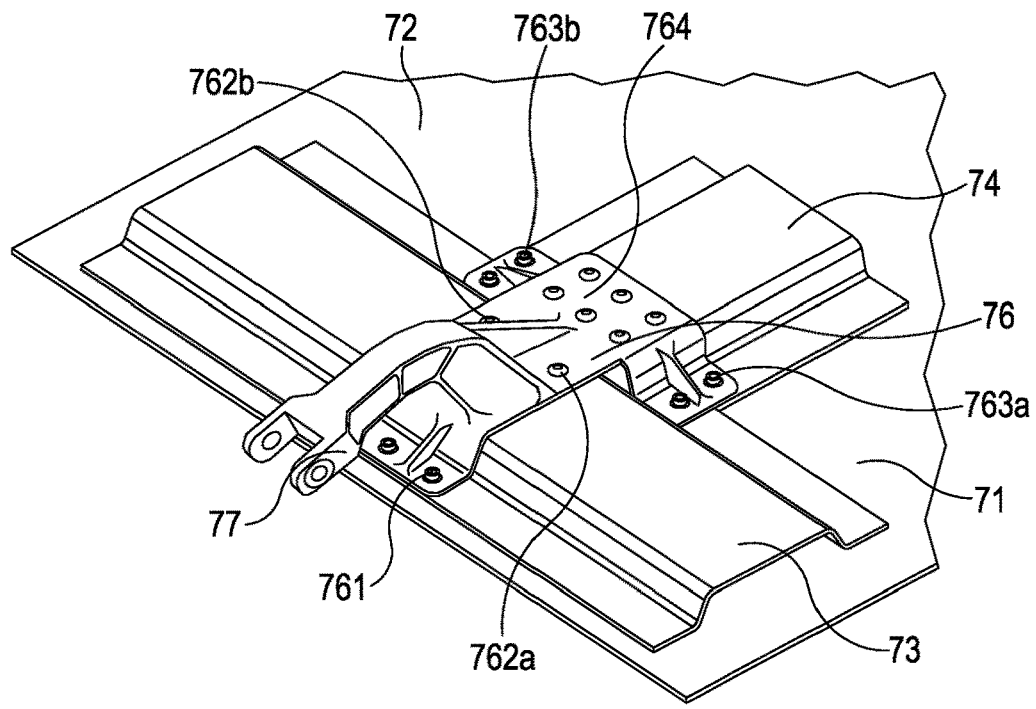
FIG. 7 shows another example of a portion of a stiffened panel with a fitting according to the invention.

FIG. 7 shows a portion of a stiffened panel 71, which could for example be part of a fan cowl door. The stiffened panel 71 comprises a panel body 72 made from a composite material. A first stiffener 73 and a second stiffener 74 are arranged on the panel body 72. The second stiffener 74 is aligned perpendicularly to the first stiffener 73. An end of the second stiffener 74 meets the first stiffener 73. In the example of a fan cowl door, the panel body 72 may be curved, the first stiffener 73 may constitute a longitudinal stiffener and the second stiffener 74 may constitute a circumferential stiffener.

The first stiffener 73 and the second stiffener 74 are hollow and have a top hat or omega cross-section. The stiffeners 73, 74 could be attached to the panel body 72 by any suitable means, e.g. using a bonding technique or mechanical fasteners. The stiffeners 73, 74 may be made from a composite material.

In an embodiment, the stiffeners 73, 74 may be hollow and made from a composite material and/or may be formed integrally with the panel body 72. Advantageously, a one-shot manufacturing process may be used to make the stiffened panel 71 comprising the panel body 72 and integrally formed stiffeners 73, 74. Resin infusion (or vacuum infusion) may be a suitable one-shot manufacturing process.

A fitting comprises a body 76, which is fastened to the first stiffener 73 and the second stiffener 74. Accordingly, the body 76 provides a junction to transfer load, in use, between the first and second stiffeners 73, 74. The body 76 also comprises an integral hinge fitting 77. The integral hinge fitting 77 is arranged such that it extends beyond an edge of the panel body 72.

The body 76 extends transversely across the first stiffener 73 and overlaps an end portion of the second stiffener 74. The body 76 is shaped and dimensioned to match substantially the profiles of the first and second stiffeners 73, 74. Accordingly, the body 76 fits relatively snugly across the first stiffener 73 and over the end portion of the second stiffener 74.

The body 76 is fastened to the stiffeners 73, 74 by a plurality of mechanical fasteners.

A first array 761 of mechanical fasteners comprises a row of three mechanical fasteners, which extends in a lengthways direction relative to the first stiffener 73. The fasteners each fasten the body 76 to a flange of the first stiffener 73 (and the panel body 72 beneath the first stiffener 73).

A second array 762a of mechanical fasteners comprises a mechanical fastener, which fastens the body 76 to a raised central portion of the first stiffener 73.

A third array 762b of mechanical fasteners comprises a mechanical fastener, which fastens the body 76 to a raised central portion of the first stiffener 73. The third array 762b of mechanical fasteners is located on the opposite side of the integral hinge fitting 77 from the second array 762a of mechanical fasteners.

A fourth array 763a of mechanical fasteners comprises two mechanical fasteners. One of the mechanical fasteners in the fourth array 763a fastens the body 76 to a flange of the first stiffener 73 and the other fastens the body 76 to a flange of the second stiffener 74.

A fifth array 763b of mechanical fasteners comprises two mechanical fasteners. One of the mechanical fasteners in the fifth array 763b fastens the body 76 to a flange of the first stiffener 73 and the other fastens the body 76 to a flange of the second stiffener 74. The fifth array 763b of mechanical fasteners is located on the opposite side of a raised central portion of the second stiffener 74 from the fourth array 763a of mechanical fasteners.

A sixth array 764 of mechanical fasteners comprises two rows of three mechanical fasteners, which fasten the body 76 to the raised central portion of the second stiffener 74. The two rows of mechanical fasteners in the sixth array 764 extend in a transverse direction across the second stiffener 74.

Figure 8:
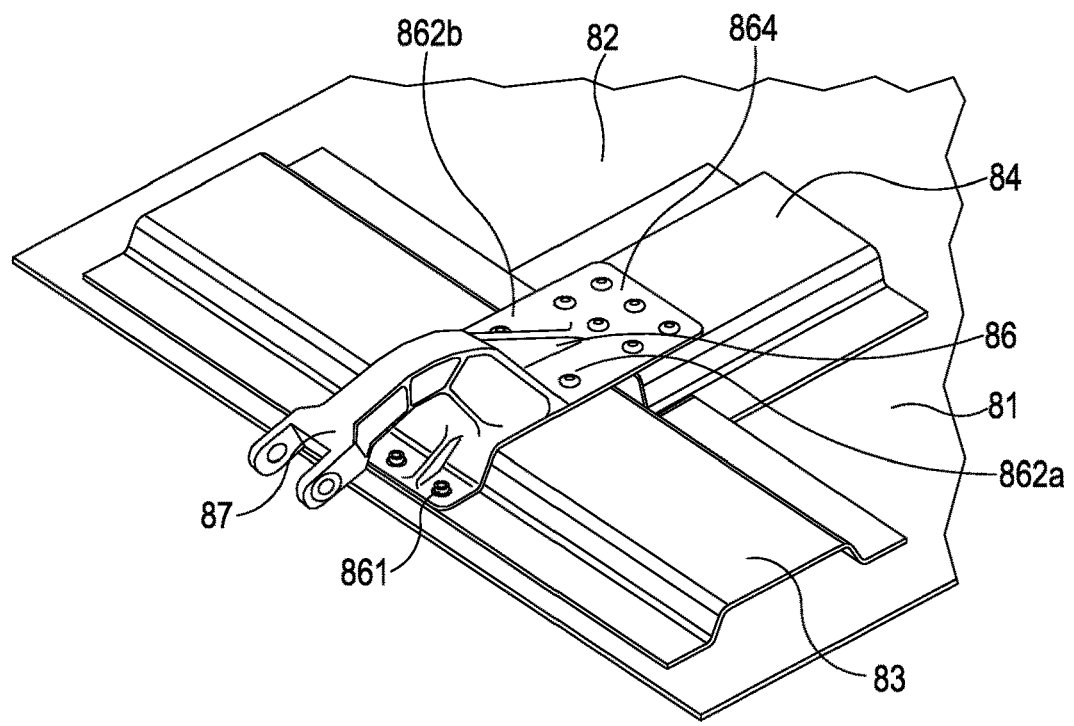
FIG. 8 shows another example of a portion of a stiffened panel with a fitting according to the invention.

FIG. 8 shows a portion of a stiffened panel 81, which could for example be part of a fan cowl door. The stiffened panel 81 comprises a panel body 82 made from a composite material. A first stiffener 83 and a second stiffener 84 are arranged on the panel body 82. The second stiffener 84 is aligned perpendicularly to the first stiffener 83. An end of the second stiffener 84 meets the first stiffener 83. In the example of a fan cowl door, the panel body 82 may be curved, the first stiffener 83 may constitute a longitudinal stiffener and the second stiffener 84 may constitute a circumferential stiffener.

The first stiffener 83 and the second stiffener 84 are hollow and have a top hat or omega cross-section. The stiffeners 83, 84 could be attached to the panel body 82 by any suitable means, e.g. using a bonding technique or mechanical fasteners. The stiffeners 83, 84 may be made from a composite material.

In an embodiment, the stiffeners 83, 84 may be hollow and made from a composite material and/or may be formed integrally with the panel body 82. Advantageously, a one-shot manufacturing process may be used to make the stiffened panel 81 comprising the panel body 82 and integrally formed stiffeners 83, 84. Resin infusion (or vacuum infusion) may be a suitable one-shot manufacturing process.

A fitting comprises a body 86, which is fastened to the first stiffener 83 and the second stiffener 84. Accordingly, the body 86 provides a junction to transfer load, in use, between the first and second stiffener 83, 84. The body 86 also comprises an integral hinge fitting 87. The integral hinge fitting 87 is arranged such that it extends beyond an edge of the panel body 82.

The body 86 extends transversely across the first stiffener 83 and overlaps an end portion of the second stiffener 84. The body 86 is shaped and dimensioned to match substantially the profiles of the first and second stiffeners 83, 84. Accordingly, the body 86 fits relatively snugly across the first stiffener 83 and over the end portion of the second stiffener 84.

The body 86 is fastened to the stiffeners 83, 84 by a plurality of mechanical fasteners.

A first array 861 of mechanical fasteners comprises a row of three mechanical fasteners, which extends in a lengthways direction relative to the first stiffener 83.

The fasteners each fasten the body 86 to a flange of the first stiffener 83 (and the panel body 82 beneath the first stiffener 83).

A second array 862a of mechanical fasteners comprises a mechanical fastener, which fastens the body 86 to a raised central portion of the first stiffener 83.

A third array 862b of mechanical fasteners comprises a mechanical fastener, which fastens the body 86 to a raised central portion of the first stiffener 83. The third array 862b of mechanical fasteners is located on the opposite side of the integral hinge fitting 87 from the second array 862a of mechanical fasteners.

A fourth array 864 of mechanical fasteners comprises two rows of three mechanical fasteners, which fasten the body 86 to a raised central portion of the second stiffener 84. The two rows of mechanical fasteners in the fourth array 864 extend in a transverse direction across the second stiffener 84.

Compared with the fittings shown for example in FIGS. 5 and 6, the fittings shown in FIGS. 7 and 8 are relatively narrow. Conveniently, a narrower fitting, which, as a result of its reduced size, may be relatively cheap to manufacture, may be used in conjunction with a continuous first (e.g. longitudinal) stiffener extending, in use, underneath the fitting. Accordingly, the load transfer path for the fitting, in use, can be focused on the second (e.g. circumferential stiffener), thereby permitting use of a narrower fitting.

Figure 9:
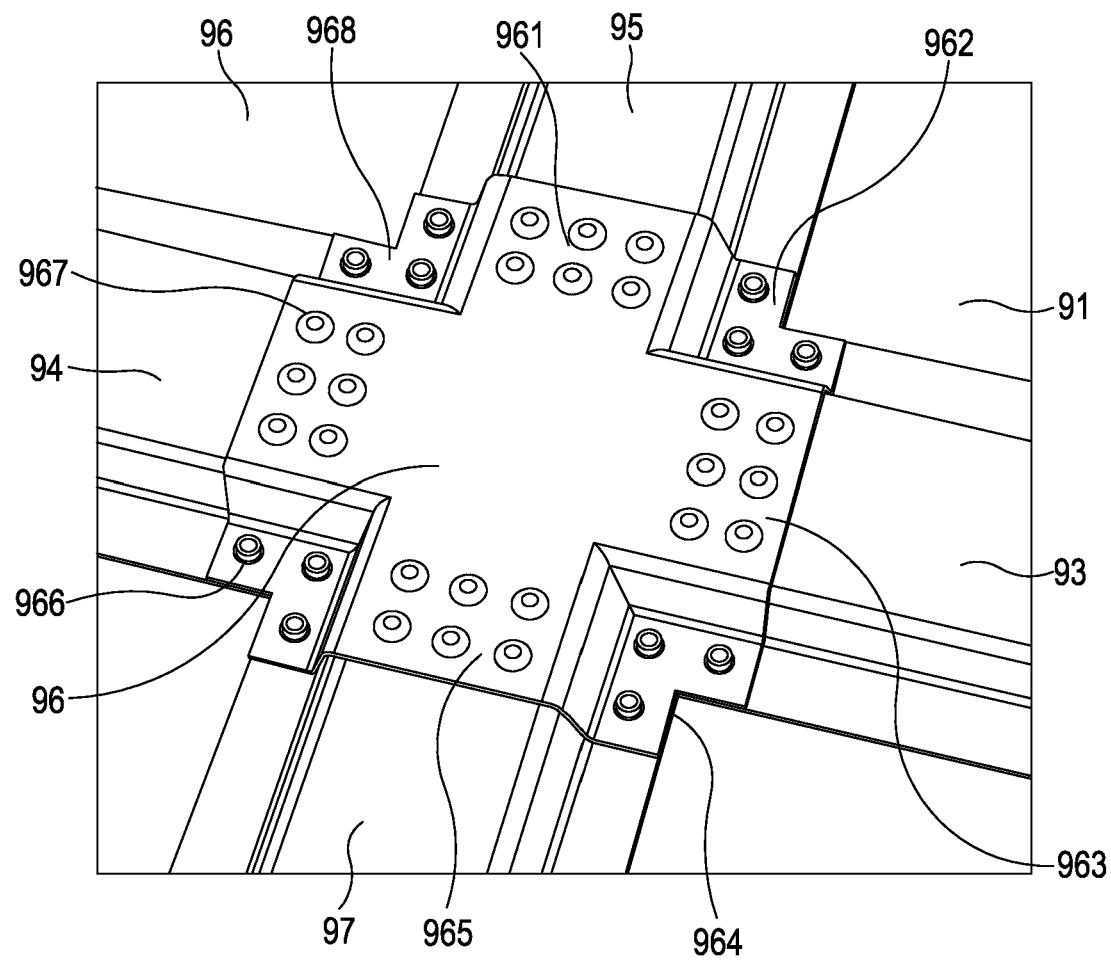
FIG. 9 shows another example of a portion of a stiffened panel with a fitting according to the invention.

FIG. 9 shows a portion of a stiffened panel 91, which could for example be part of a fan cowl door. The stiffened panel 91 comprises a panel body 92 made from a composite material. A first stiffener 93, a second stiffener 94, a third stiffener 95 and a fourth stiffener 97 are arranged on the panel body 92. The first stiffener 93 is aligned with the second stiffener 94. The third stiffener 95 is aligned with the fourth stiffener 97. The third stiffener 95 and the fourth stiffener 97 are perpendicular to the first stiffener 93 and the second stiffener 94. There is a gap between the stiffeners 93, 94, 95, 97. The gap is bounded by an end of each of the stiffeners 93, 94, 95, 97. In the example of a fan cowl door, the panel body 92 may be curved, the first stiffener 93 and the second stiffener 94 may constitute longitudinal stiffeners and the third stiffener 95 and the fourth stiffener 97 may constitute circumferential stiffeners.

The first stiffener 93, the second stiffener 94, the third stiffener 95 and the fourth stiffener 97 are hollow and have a top hat or omega cross-section. The stiffeners 93, 94, 95, 97 could be attached to the panel body 92 by any suitable means, e.g. using a bonding technique or mechanical fasteners. The stiffeners 93, 94, 95, 97 may be made from a composite material.

In an embodiment, the stiffeners 93, 94, 95, 97 may be hollow and made from a composite material and/or may be formed integrally with the panel body 92.

Advantageously, a one-shot manufacturing process may be used to make the stiffened panel 91 comprising the panel body 92 and integrally formed stiffeners 93, 94, 95, 97. Resin infusion (or vacuum infusion) may be a suitable one-shot manufacturing process.

A fitting comprises a body 96, which is fastened to the first stiffener 93, the second stiffener 94, the third stiffener 95 and the fourth stiffener 97. Accordingly, the body 96 provides a junction to transfer load, in use, between the stiffeners 93, 94, 95, 97.

The body 96 spans the gap and overlaps an end portion of each of the first, second, third and fourth stiffeners 93, 94, 95, 97. The body 96 is shaped and dimensioned to match substantially the profiles of the first, second, third and fourth stiffeners 93, 94, 95, 97. Accordingly, the body 86 fits relatively snugly over the end portion of each of the stiffeners 93, 94, 95, 97.

The body 96 is fastened to the stiffeners 93, 94, 95, 97 by a plurality of mechanical fasteners.

A first array 961 of mechanical fasteners comprises two rows of three mechanical fasteners, which fasten the body 96 to a raised central portion of the third stiffener 95.

The two rows of mechanical fasteners in the first array 961 extend in a transverse direction across the third stiffener 95.

A second array 962 of mechanical fasteners comprises an L-shaped group of three mechanical fasteners. One of the mechanical fasteners in the L-shaped group fastens the body 96 to a flange of the third stiffener 95 (and the panel body 92 beneath the third stiffener 95). The other two of the mechanical fasteners in the L-shaped group fasten the body 96 to a flange of the first stiffener 93 (and the panel body 92 beneath the first stiffener 93).

A third array 963 of mechanical fasteners comprises two rows of three mechanical fasteners, which fasten the body 96 to a raised central portion of the first stiffener 93. The two rows of mechanical fasteners in the third array 963 extend in a transverse direction across the first stiffener 93.

A fourth array 964 of mechanical fasteners comprises an L-shaped group of three mechanical fasteners. One of the mechanical fasteners in the L-shaped group fastens the body 96 to a flange of the first stiffener 93 (and the panel body 92 beneath the first stiffener 93). The other two of the mechanical fasteners in the L-shaped group fasten the body 96 to a flange of the fourth stiffener 97 (and the panel body 92 beneath the fourth stiffener 97).

A fifth array 965 of mechanical fasteners comprises two rows of three mechanical fasteners, which fasten the body 96 to a raised central portion of the fourth stiffener 97. The two rows of mechanical fasteners in the fifth array 965 extend in a transverse direction across the fourth stiffener 97.

A sixth array 966 of mechanical fasteners comprises an L-shaped group of three mechanical fasteners. One of the mechanical fasteners in the L-shaped group fastens the body 96 to a flange of the fourth stiffener 97 (and the panel body 92 beneath the fourth stiffener 97). The other two of the mechanical fasteners in the L-shaped group fasten the body 96 to a flange of the second stiffener 94 (and the panel body 92 beneath the second stiffener 94).

A seventh array 967 of mechanical fasteners comprises two rows of three mechanical fasteners, which fasten the body 96 to a raised central portion of the second stiffener 94. The two rows of mechanical fasteners in the seventh array 967 extend in a transverse direction across the second stiffener 94.

An eighth array 968 of mechanical fasteners comprises an L-shaped group of three mechanical fasteners. One of the mechanical fasteners in the L-shaped group fastens the body 96 to a flange of the second stiffener 94 (and the panel body 92 beneath the second stiffener 94). The other two of the mechanical fasteners in the L-shaped group fasten the body 96 to a flange of the third stiffener 95 (and the panel body 92 beneath the third stiffener 95).

The arrangement shown in FIG. 9 may be utilised for example when there is a requirement for a stiffener junction in a central portion of a panel. The arrangement shown in FIG. 9 creates a four-way "X" type junction. For example, similar arrangements could create any type of junction between stiffeners, e.g. a two-way, three-way, four-way, five-way, six-way, seven-way or eight-way junction.

The fitting shown in FIG. 9 could also be configured to perform an additional function (i.e. in addition to load transfer) such as a hold open rod (HOR) or an access panel hinge or latch.

Figures 10, 11:
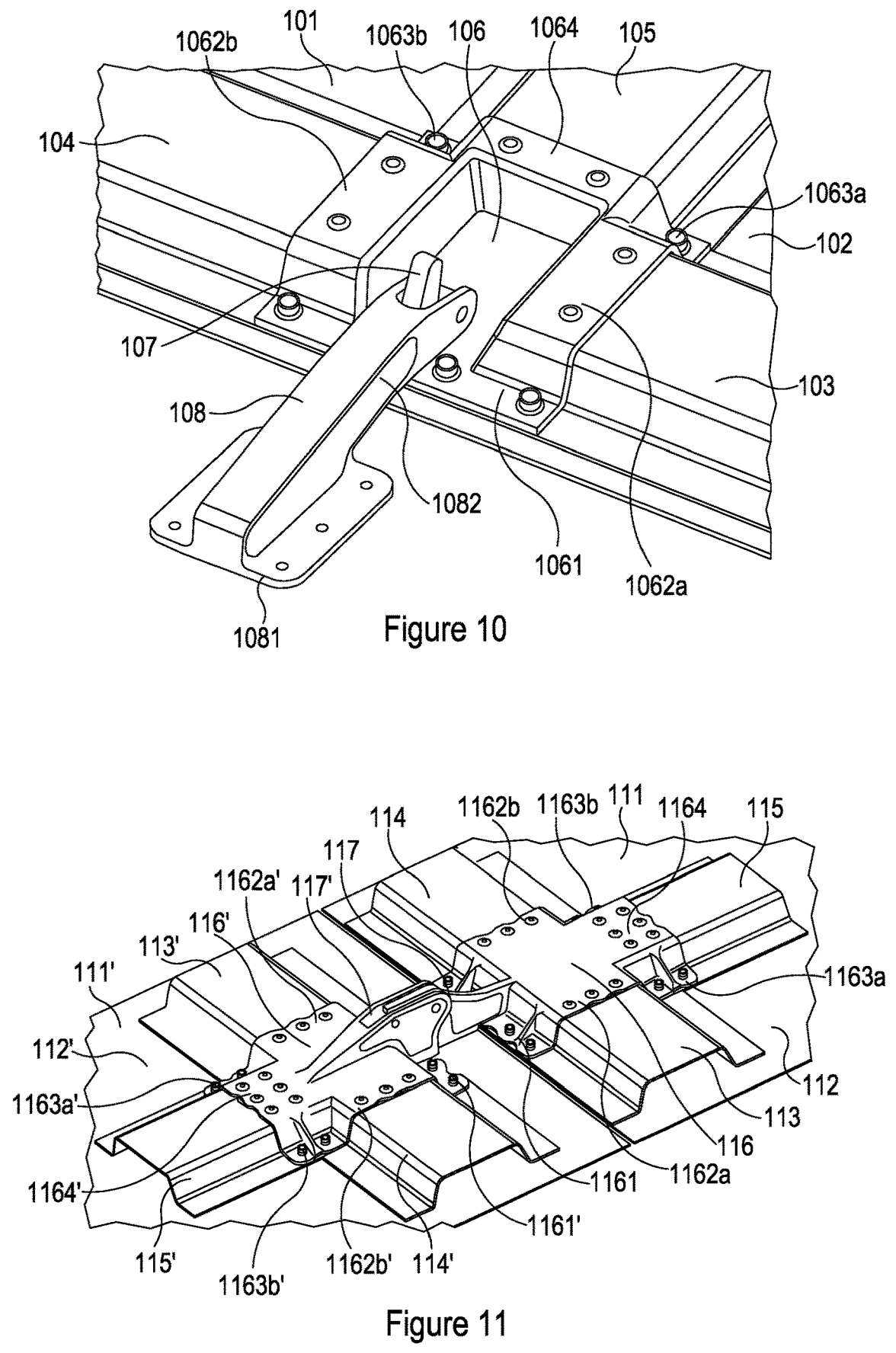

FIG. 10 shows a portion of a stiffened panel 101, which could for example be part of a fan cowl door. The stiffened panel 101 comprises a panel body 102 made from a composite material. A first stiffener 103, a second stiffener 104 and a third stiffener 105 are arranged on the panel body 102. The first stiffener 103 and the second stiffener 104 are aligned with each other and there is a gap between the first stiffener 103 and the second stiffener 104. The first stiffener 103 and the second stiffener 104 are disposed relatively close to an edge of the panel body 102. The first stiffener 103 and the second stiffener 104 extend parallel to the edge of the panel body 102. The third stiffener 105 is aligned perpendicularly to the first stiffener 103 and the second stiffener 104. The third stiffener 105 terminates at one end at the gap between the first stiffener 103 and the second stiffener 104.

The first stiffener 103, the second stiffener 104 and the third stiffener 105 are hollow and have a top hat or omega cross-section. The stiffeners 103, 104, 105 could be attached to the panel body 102 by any suitable means, e.g. using a bonding technique or mechanical fasteners. The stiffeners 103, 104, 105 may be made from a composite material.

In an embodiment, the stiffeners 103, 104, 105 may be hollow and made from a composite material and/or may be formed integrally with the panel body 102. Advantageously, a one-shot manufacturing process may be used to make the stiffened panel 101 comprising the panel body 102 and integrally formed stiffeners 103, 104, 105. Resin infusion (or vacuum infusion) may be a suitable one-shot manufacturing process.

A fitting comprises a body 106, which is fastened to the first stiffener 103, the second stiffener 104 and the third stiffener 105. Accordingly, the body 106 provides a junction to transfer load, in use, between the first, second and third stiffeners 103, 104, 105. The body 106 also comprises an integral fitting 107 in the form of a prong for engaging with a hook of a hook-type hinge fitting.

The body 106 covers the gap between the first, second and third stiffeners 103, 104, 105 and overlaps end portions of each of the first, second and third stiffeners 103, 104, 105. The body 106 is shaped and dimensioned to match substantially the profiles of the first, second and third stiffeners 103, 104, 105. Accordingly, the body 106 covers the gap and fits relatively snugly over the end portions of the first, second and third stiffeners 103, 104, 105.

The body 106 comprises a recessed portion, which is arranged such that the recessed portion is disposed in the gap between the first, second and third stiffeners 103, 104, 105. The recessed portion has three side walls generally corresponding to the location of the ends of the first, second and third stiffeners 103, 104, 105. The recessed portion also has an open side where no stiffener is located. The integral fitting 107 extends upwards from a base of the recessed portion of the body 106. The integral fitting 107 is located close to the open side of the recessed portion of the body 106.

A hook 108 of a hook-type hinge fitting is also shown in FIG. 10. The hook 108 comprises a base plate 1081 adapted to be fastened to a surface such as a panel (not shown) and a curved neck portion 1082 extending upwards from and beyond the edge of the base plate 1081. At its distal end the curved neck portion 1082 has an aperture therethrough for engagement with the integral fitting 107. As shown in FIG. 10, the integral fitting 107 in the form of the prong passes through the aperture in the neck portion 1082 of the hook 108. Thus, in this example of a hook-type hinge fitting, this is how the hook 108 engages with the integral fitting 107.

The body 106 is fastened to the stiffeners 103, 104, 105 and/or the panel body 102 by a plurality of mechanical fasteners.

A first array 1061 of mechanical fasteners comprises a row of four mechanical fasteners, which are arranged such that: a first end fastener fastens the body 106 to a flange of the first stiffener 103 (and the panel body 102 beneath the first stiffener 103); the two middle fasteners fasten the body 106 to the panel body 102 in the gap between the first stiffener 103 and the second stiffener 104; and a second end fastener fastens the body 106 to a flange of the second stiffener 104 (and the panel body 102 beneath the second stiffener 104). The integral fitting 107 is disposed between the two middle fasteners.

A second array 1062*a* of mechanical fasteners comprises a row of two mechanical fasteners, which fasten the body 106 to a raised central portion of the first stiffener 103. The row of mechanical fasteners in the second array 1062*a* extends in a transverse direction across the first stiffener 103.

A third array 1062*b* of mechanical fasteners comprises a row of two mechanical fasteners, which fasten the body 106 to a raised central portion of the second stiffener 104. The row of mechanical fasteners in the second array 1062*b* extends in a transverse direction across the second stiffener 104.

A fourth array 1063*a* of mechanical fasteners comprises one mechanical fastener. The mechanical fastener in the fourth array 1063*a* fastens the body 106 to a flange of the third stiffener 105. In an embodiment, the mechanical fastener in the fourth array 1063*a* may fasten the body 106 to a flange of the first stiffener 103. In an embodiment, the flange of the first stiffener 103 and the flange of the third stiffener 105 may overlap one another, with either one on top of the other, in which case the mechanical fastener in the fourth array 1063*a* may fasten the body 106 to the flange of the first stiffener 103 and to the flange of the third stiffener 105.

A fifth array 1063*b* of mechanical fasteners comprises one mechanical fastener. The mechanical fastener in the fifth array 1063*b* fastens the body 106 to a flange of the third stiffener 105. The fifth array 1063*b* of mechanical fasteners is located on the other side of a raised central portion of the third stiffener 105 from the fourth array 1063*a* of mechanical fasteners. In an embodiment, the mechanical fastener in the fifth array 1063*b* may fasten the body 106 to a flange of the second stiffener 104. In an embodiment, the flange of the second stiffener 104 and the flange of the third stiffener 105 may overlap one another, with either one on top of the other, in which case the mechanical fastener in the fifth array 1063*b* may fasten the body 106 to the flange of the second stiffener 104 and to the flange of the third stiffener 105.

A sixth array 1064 of mechanical fasteners comprises a row of two mechanical fasteners, which fasten the body 106 to the raised central portion of the third stiffener 105. The row of mechanical fasteners in the sixth array 1064 extends in a transverse direction across the third stiffener 105.

FIG. 11 shows a first stiffened panel 111 and a second stiffened panel 111', which are connected to each other by a blade-type hinge fitting. The first and second stiffened panels 111, 111' are substantially the same as each other and like features are labelled with like reference numerals, except with a prime.

The first stiffened panel 111 comprises a panel body 112 made from a composite material. A first stiffener 113, a second stiffener 114 and a third stiffener 115 are arranged on the panel body 112. The first stiffener 113 and the second stiffener 114 are aligned with each other and there is a gap between the first stiffener 113 and the second stiffener 114. The first stiffener 113 and the second stiffener 114 are disposed relatively close to an edge of the panel body 112. The first stiffener 113 and the second stiffener 114 extend parallel to the edge of the panel body 112. The third stiffener 115 is aligned perpendicularly to the first stiffener 113 and the second stiffener 114. The third stiffener 115 terminates at one end at the gap between the first stiffener 113 and the second stiffener 114.

The first stiffener 113, the second stiffener 114 and the third stiffener 115 are hollow and have a top hat or omega cross-section. The stiffeners 113, 114, 115 could be attached to the panel body 112 by any suitable means, e.g. using a bonding technique or mechanical fasteners. The stiffeners 113, 114, 115 may be made from a composite material.

In an embodiment, the stiffeners 113, 114, 115 may be hollow and made from a composite material and/or may be formed integrally with the panel body 112. Advantageously, a one-shot manufacturing process may be used to make the stiffened panel 111 comprising the panel body 112 and integrally formed stiffeners 113, 114, 115. Resin infusion (or vacuum infusion) may be a suitable one-shot manufacturing process.

A fitting comprises a body 116, which is fastened to the first stiffener 113, the second stiffener 114 and the third stiffener 115. Accordingly, the body 116 provides a junction to transfer load, in use, between the first, second and third stiffeners 113, 114, 115. The body 116 also comprises an integral fitting 117 in the form of a first part of a blade-type hinge fitting. The integral fitting 117 extends beyond the edge of the panel body 112.

The body 116 covers the gap between the first, second and third stiffeners 113, 114, 115 and overlaps end portions of each of the first, second and third stiffeners 113, 114, 115. The body 116 is shaped and dimensioned to match substantially the profiles of the first, second and third stiffeners 113, 114, 115. Accordingly, the body 116 covers the gap and fits relatively snugly over the end portions of the first, second and third stiffeners 113, 114, 115.

The body 116 is fastened to the stiffeners 113, 114, 115 and/or the panel body 112 by a plurality of mechanical fasteners.

A first array 1161 of mechanical fasteners comprises a row of four mechanical fasteners, which are arranged such that: a first end fastener fastens the body 116 to a flange of the first stiffener 113 (and the panel body 112 beneath the first stiffener 113); the two middle fasteners fasten the body 116 to the panel body 112 in the gap between the first stiffener 113 and the second stiffener 114; and a second end fastener fastens the body 116 to a flange of the second stiffener 114 (and the panel body 112 beneath the second stiffener 114). The integral fitting 117 is disposed between the two middle fasteners.

A second array 1162*a* of mechanical fasteners comprises a row of three mechanical fasteners, which fasten the body 116 to a raised central portion of the first stiffener 113. The row of mechanical fasteners in the second array 1162*a* extends in a transverse direction across the first stiffener 113.

A third array 1162*b* of mechanical fasteners comprises a row of three mechanical fasteners, which fasten the body 116 to a raised central portion of the second stiffener 114. The row of mechanical fasteners in the second array 1162*b* extends in a transverse direction across the second stiffener 114.

A fourth array 1163*a* of mechanical fasteners comprises two mechanical fasteners. One of the mechanical fasteners in the fourth array 1163*a* fastens the body 116 to a flange of the first stiffener 113. The other of the mechanical fasteners in the fourth array 1163*a* fastens the body 116 to a flange of the third stiffener 115. In an embodiment, the flange of the first stiffener 113 and the flange of the third stiffener 115 may overlap one another, with either one on top of the other, in which case the mechanical fasteners in the fourth array 1163*a* may each fasten the body 116 to the flange of the first stiffener 113 and to the flange of the third stiffener 115.

A fifth array 1163*b* of mechanical fasteners comprises two mechanical fasteners. One of the mechanical fasteners in the fourth array 1163*b* fastens the body 116 to a flange of the second stiffener 114. The other of the mechanical fasteners in the fourth array 1163*b* fastens the body 116 to a flange of the third stiffener 115. The fifth array 1163*b* of mechanical fasteners is located on the other side of a raised central portion of the third stiffener 115 from the fourth array 1163*a* of mechanical fasteners. In an embodiment, the flange of the second stiffener 114 and the flange of the third stiffener 115 may overlap one another, with either one on top of the other, in which case the mechanical fasteners in the fifth array 1163*b* may each fasten the body 116 to the flange of the second stiffener 114 and to the flange of the third stiffener 115.

A sixth array 1164 of mechanical fasteners comprises two rows of three mechanical fasteners, which fasten the body 116 to the raised central portion of the third stiffener 115. The rows of mechanical fasteners in the sixth array 1164 extend in a transverse direction across the third stiffener 115.

The second stiffened panel 111' comprises a panel body 112' made from a composite material. A first stiffener 113', a second stiffener 114' and a third stiffener 115' are arranged on the panel body 112'. The first stiffener 113' and the second stiffener 114' are aligned with each other and there is a gap between the first stiffener 113' and the second stiffener 114'. The first stiffener 113' and the second stiffener 114' are disposed relatively close to an edge of the panel body 112'. The first stiffener 113' and the second stiffener 114' extend parallel to the edge of the panel body 112'. The third stiffener 115' is aligned perpendicularly to the first stiffener 113' and the second stiffener 114'. The third stiffener 115' terminates at one end at the gap between the first stiffener 113' and the second stiffener 114'.

The first stiffener 113', the second stiffener 114' and the third stiffener 115' are hollow and have a top hat or omega cross-section. The stiffeners 113', 114', 115' could be attached to the panel body 112' by any suitable means, e.g. using a bonding technique or mechanical fasteners. The stiffeners 113', 114', 115' may be made from a composite material.

In an embodiment, the stiffeners 113', 114', 115' may be hollow and made from a composite material and/or may be formed integrally with the panel body 112'. Advantageously, a one-shot manufacturing process may be used to make the stiffened panel 111' comprising the panel body 112' and integrally formed stiffeners 113', 114', 115'. Resin infusion (or vacuum infusion) may be a suitable one-shot manufacturing process.

A fitting comprises a body 116', which is fastened to the first stiffener 113', the second stiffener 114' and the third stiffener 115'. Accordingly, the body 116' provides a junction to transfer load, in use, between the first, second and third stiffeners 113', 114', 115'. The body 116' also comprises an integral fitting 117' in the form of a second part of a blade-type hinge fitting. The integral fitting 117' extends beyond the edge of the panel body 112'. The first part and the second part of the blade-type hinge fitting engage with each other, thereby forming the blade-type hinge fitting connecting the first stiffened panel 111 to the second stiffened panel 111'. The blade-type hinge fitting may typically be used to provide a hinge between two fan cowl doors on a business jet. The blade-type hinge fitting typically has a relatively low profile and hence may be relatively compact.

The body 116' covers the gap between the first, second and third stiffeners 113', 114', 115' and overlaps end portions of each of the first, second and third stiffeners 113', 114', 115'. The body 116' is shaped and dimensioned to match substantially the profiles of the first, second and third stiffeners 113', 114', 115'. Accordingly, the body 116' covers the gap and fits relatively snugly over the end portions of the first, second and third stiffeners 113', 114', 115'.

The body 116' is fastened to the stiffeners 113', 114', 115' and/or the panel body 112' by a plurality of mechanical fasteners.

A first array 1161' of mechanical fasteners comprises a row of four mechanical fasteners, which are arranged such that: a first end fastener fastens the body 116' to a flange of the first stiffener 113' (and the panel body 112' beneath the first stiffener 113'); the two middle fasteners fasten the body 116' to the panel body 112' in the gap between the first stiffener 113' and the second stiffener 114'; and a second end fastener fastens the body 116' to a flange of the second stiffener 114' (and the panel body 112' beneath the second stiffener 114'). The integral fitting 117' is disposed between the two middle fasteners.

A second array 1162*a*' of mechanical fasteners comprises a row of three mechanical fasteners, which fasten the body 116' to a raised central portion of the first stiffener 113'. The row of mechanical fasteners in the second array 1162*a*' extends in a transverse direction across the first stiffener 113'.

A third array 1162*b*' of mechanical fasteners comprises a row of three mechanical fasteners, which fasten the body 116' to a raised central portion of the second stiffener 114'. The row of mechanical fasteners in the second array 1162*b*' extends in a transverse direction across the second stiffener 114'.

A fourth array 1163*a*' of mechanical fasteners comprises two mechanical fasteners. One of the mechanical fasteners in the fourth array 1163*a*' fastens the body 116' to a flange of the first stiffener 113'. The other of the mechanical fasteners in the fourth array 1163*a*' fastens the body 116' to a flange of the third stiffener 115'. In an embodiment, the flange of the first stiffener 113' and the flange of the third stiffener 115' may overlap one another, with either one on top of the other, in which case the mechanical fasteners in the fourth array 1163*a*' may each fasten the body 116' to the flange of the first stiffener 113' and to the flange of the third stiffener 115'.

A fifth array 1163*b*' of mechanical fasteners comprises two mechanical fasteners. One of the mechanical fasteners in the fourth array 1163*b*' fastens the body 116' to a flange of the second stiffener 114'. The other of the mechanical fasteners in the fourth array 1163b' fastens the body 116' to a flange of the third stiffener 115'. The fifth array 1163b' of mechanical fasteners is located on the other side of a raised central portion of the third stiffener 115' from the fourth array 1163a' of mechanical fasteners. In an embodiment, the flange of the second stiffener 114' and the flange of the third stiffener 115' may overlap one another, with either one on top of the other, in which case the mechanical fasteners in the fifth array 1163b' may each fasten the body 116' to the flange of the second stiffener 114' and to the flange of the third stiffener 115'.

A sixth array 1164' of mechanical fasteners comprises two rows of three mechanical fasteners, which fasten the body 116' to the raised central portion of the third stiffener 115'. The rows of mechanical fasteners in the sixth array 1164' extend in a transverse direction across the third stiffener 115'.

Figure 12:
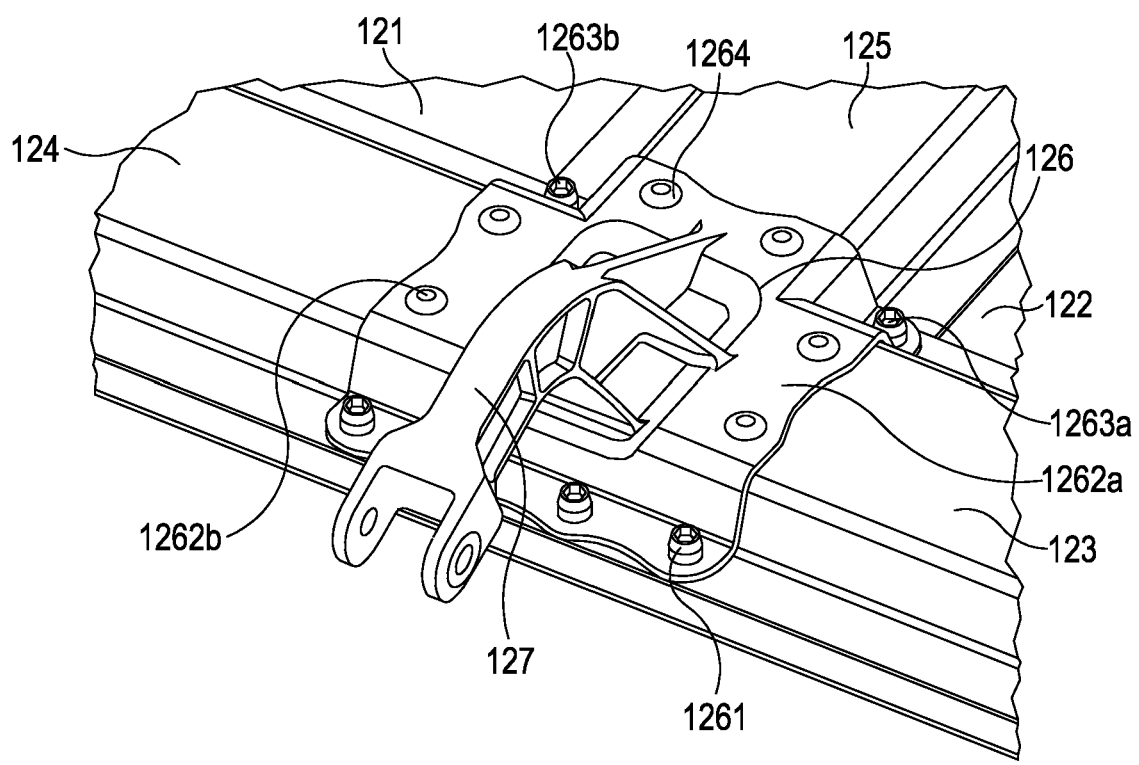
FIG. 12 shows another example of a portion of a stiffened panel with a fitting according to the invention.

FIG. 12 shows a portion of a stiffened panel 121, which could for example be part of a fan cowl door. The stiffened panel 121 comprises a panel body 122 made from a composite material. A first stiffener 123, a second stiffener 124 and a third stiffener 125 are arranged on the panel body 122. The first stiffener 123 and the second stiffener 124 are aligned with each other and there is a gap between the first stiffener 123 and the second stiffener 124. The third stiffener 125 is aligned perpendicularly to the first stiffener 123 and the second stiffener 124. The third stiffener 125 terminates at one end at the gap between the first stiffener 123 and the second stiffener 124.

The first stiffener 123, second stiffener 124 and the third stiffener 125 are hollow and have a top hat or omega cross-section. The stiffeners 123, 124, 125 could be attached to the panel body 122 by any suitable means, e.g. using a bonding technique or mechanical fasteners. The stiffeners 123, 124, 125 may be made from a composite material.

In an embodiment, the stiffeners 123, 124, 125 may be hollow and made from a composite material and/or may be formed integrally with the panel body 122. Advantageously, a one-shot manufacturing process may be used to make the stiffened panel 121 comprising the panel body 122 and integrally formed stiffeners 123, 124, 125. Resin infusion (or vacuum infusion) may be a suitable one-shot manufacturing process.

A fitting comprises a body 126, which is fastened to the first stiffener 123, the second stiffener 124 and the third stiffener 125. Accordingly, the body 126 provides a junction to transfer load, in use, between the first, second and third stiffeners 123, 124, 125. The body 126 also comprises an integral hinge fitting 127 in the form of a gooseneck. The integral hinge fitting 127 is arranged such that it extends beyond an edge of the panel body 122.

The body 126 covers the gap between the first, second and third stiffeners 123, 124, 125 and overlaps end portions of each of the first, second and third stiffeners 123, 124, 125. The body 126 is shaped and dimensioned to match substantially the profiles of the first, second and third stiffeners 123, 124, 125. Accordingly, the body 126 covers the gap and fits relatively snugly over the end portions of the first, second and third stiffeners 123, 124, 125.

The body 126 is fastened to the stiffeners 123, 124, 125 and/or the panel body 122 by a plurality of mechanical fasteners.

A first array 1261 of mechanical fasteners comprises a row of four mechanical fasteners, which are arranged such that: a first end fastener fastens the body 126 to a flange of the first stiffener 123 (and the panel body 122 beneath the first stiffener 123); the two middle fasteners fasten the body 126 to the panel body 122 in the gap between the first stiffener 123 and the second stiffener 124; and a second end fastener fastens the body 126 to a flange of the second stiffener 124 (and the panel body 122 beneath the second stiffener 124).

A second array 1262a of mechanical fasteners comprises a row of two mechanical fasteners, which fasten the body 126 to a raised central portion of the first stiffener 123. The row of mechanical fasteners in the second array 1262a extends in a transverse direction across the first stiffener 123.

A third array 1262b of mechanical fasteners comprises a row of two mechanical fasteners, which fasten the body 126 to a raised central portion of the second stiffener 124. The row of mechanical fasteners in the second array 1262b extends in a transverse direction across the second stiffener 124.

A fourth array 1263a of mechanical fasteners comprises one mechanical fastener. The mechanical fastener in the fourth array 1263a fastens the body 126 to a flange of the third stiffener 125. In an embodiment, the mechanical fastener in the fourth array 1263a may fasten the body 126 to a flange of the first stiffener 123. In an embodiment, the flange of the first stiffener 123 and the flange of the third stiffener 125 may overlap one another, with either one on top of the other, in which case the mechanical fastener in the fourth array 1263a may fasten the body 126 to the flange of the first stiffener 123 and to the flange of the third stiffener 125.

A fifth array 1263b of mechanical fasteners comprises one mechanical fastener. The mechanical fastener in the fifth array 1263b fastens the body 126 to a flange of the third stiffener 125. The fifth array 1263b of mechanical fasteners is located on the other side of a raised central portion of the third stiffener 125 from the fourth array 1263a of mechanical fasteners. In an embodiment, the mechanical fastener in the fifth array 1263b may fasten the body 126 to a flange of the second stiffener 124. In an embodiment, the flange of the second stiffener 124 and the flange of the third stiffener 125 may overlap one another, with either one on top of the other, in which case the mechanical fastener in the fifth array 1263b may fasten the body 126 to the flange of the second stiffener 124 and to the flange of the third stiffener 125.

A sixth array 1264 of mechanical fasteners comprises a row of two mechanical fasteners, which fasten the body 126 to the raised central portion of the third stiffener 125. The row of mechanical fasteners in the sixth array 1264 extends in a transverse direction across the third stiffener 125.

FIG. 13 shows an aircraft 131. The aircraft comprises fuselage 132 and two wings 133, 133', one on each side of the fuselage 132.

Connected to an underside of one of the wings 133, there is a first nacelle 134 housing an engine. The first nacelle 134 has a pair of fan cowl doors 135, 136. The fan cowl doors 135, 136 allow access to the interior of the nacelle during aircraft maintenance. One or more of the fan cowl doors 135, 136 comprises a stiffened panel as described herein.

Connected to an underside of the other of the wings 133', there is a first nacelle 134' housing an engine. The first nacelle 134 has a pair of fan cowl doors 135', 136'. The fan cowl doors 135', 136' allow access to the interior of the nacelle during aircraft maintenance. One or more of the fan cowl doors 135', 136' comprises a stiffened panel as described herein.

FIG. 14 is a flow chart illustrating an example embodiment of a method of manufacture according to the invention.

In a first step 141, the method comprises providing a panel body with a plurality of stiffeners arranged thereon. In some embodiments, the stiffeners may be integrally formed with the panel body.

In a second step 142, the method comprises providing a one-piece fitting comprising a fitting body configured to be fastened, in use, to two or more of the stiffeners. In some embodiments, there may be a gap between the two or more of the stiffeners. In some embodiments, the fitting body may further comprise an integral functional fitting arranged for engagement with a component other than the stiffened panel.

In a third step 143, the method comprises fastening the fitting body to the two or more stiffeners to provide, in use, a junction to transfer load between the two or more stiffeners. The fitting body may span the or a gap between the two or more stiffeners.

The panel body, the stiffeners and/or the one-piece fitting may each be made by any suitable manufacturing process, including subtractive and additive manufacturing processes.

FIG. 15 depicts an exemplary computer-readable medium 144 carrying instructions for the manufacture of a one-piece fitting and/or at least part of a stiffened panel. In an embodiment, the instructions may be executable in an additive manufacturing process. For instance, the instructions may be executable in a three-dimensional (3D) printer.

While the invention has been described with reference to certain specific embodiments, various modifications will be apparent to the person skilled in the art without departing from the scope of the invention.

For instance, one or more, e.g. all, of the stiffeners may have a profile other than a top hat or omega profile.

One or more, e.g. all, of the stiffeners may not be hollow. For instance, a given stiffener may comprise an outer skin and a reinforcing core, e.g. a foam or honeycomb core.

The fitting body may be configured to be fastened to the two or more stiffeners by any number and arrangement of mechanical fasteners. Additionally or alternatively, the fitting body may be configured to be fastened to the two or more stiffeners using an adhesive or by a bonding process such as welding, soldering or brazing.

Washers may be used when fastening the fitting body to the two or more stiffeners using mechanical fasteners. The use of washers may prevent the mechanical fasteners from pulling against the fitting body. This may help to reduce wear, particularly when the fitting body is made from a composite material.

The integrally formed fitting may comprise any functional fitting arranged for engagement with a component other than a stiffened panel. Examples of functional fittings include hinge fittings, latch fittings, hold open rod (HOR) fittings, hoist fittings. The hinge fitting could for example be a gooseneck-type hinge fitting, a blade-type hinge fitting or a hook-type hinge fitting. In other embodiments, the integral functional fitting may comprise a magnetic fitting arranged for magnetic engagement with a component other than the stiffened panel.

Conveniently, the one-piece fitting may be configured such that the or an integrally formed fitting may not extend, in use, above the height of the stiffeners. Accordingly, the stiffened panel may be relatively compact.

Liquid or solid shims may be used between the stiffener and the fitting body to compensate for differences in surface position and/or smoothness.

For example, the panel body may be made from a metallic material or a composite material or a combination of a metallic material and a composite material. The composite material may comprise a short fibre resin transfer moulded (RTM) material.

Further, the invention can be applied to stiffened panels for any application, not just aerospace applications such as fan cowl doors.

The invention claimed is:

1. A one-piece fitting for a stiffened panel comprising a panel body with a plurality of perpendicular stiffeners arranged thereon, the fitting comprising a fitting body configured to be fastened, in use, to two or more of the perpendicular stiffeners so as to provide a junction to transfer load between the two or more perpendicular stiffeners, wherein the fitting body is configured to overlap each of the two or more perpendicular stiffeners and is configured to overlap an end portion of at least one of the two or more perpendicular stiffeners and wherein the fitting body is configured to be fastened to the perpendicular stiffeners and the panel body by a plurality of mechanical fasteners and the fitting further comprises an integral functional fitting arranged for engagement with a component other than the stiffened panel.

2. The one-piece fitting according to claim 1, wherein the fitting body comprises a recessed portion configured to be located, in use, in a gap between the two or more stiffeners.

3. The one-piece fitting according to claim 2, wherein the integral functional fitting is disposed at least partially within the recessed portion.

4. The one-piece fitting according to claim 1, wherein: the integral functional fitting comprises a mechanical fitting arranged for mechanical engagement with a component other than the stiffened panel; and/or the integral functional fitting comprises a magnetic fitting arranged for magnetic engagement with a component other than the stiffened panel.

5. The one-piece fitting according to claim 1, wherein the fitting body is configured to be fastened to two, three, four, five, six, seven, eight, nine or ten stiffeners.

6. A computer-readable medium carrying instructions for manufacturing a one-piece fitting according to claim 1.

7. A stiffened panel comprising: a panel body; a plurality of perpendicular stiffeners arranged on the panel body; and a one-piece fitting comprising a fitting body fastened to two or more of the perpendicular stiffeners, whereby the fitting body provides, in use a junction to transfer load between the two or more perpendicular stiffeners, wherein the fitting body overlaps each of the two or more perpendicular stiffeners and overlaps an end portion of at least one of the two or more perpendicular stiffeners, wherein the fitting body is fastened to the perpendicular stiffeners and the panel body by a plurality of mechanical fasteners and wherein the fitting body further comprises an integral functional fitting for engagement with a component other than the stiffened panel.

8. The stiffened panel according to claim 7, wherein the fitting body spans a gap between the two or more stiffeners.

9. The stiffened panel according to claim 7, wherein: the panel body comprises, or consists essentially of, a metal or a composite material.

10. A nacelle comprising a stiffened panel according to claim 7.

11. A structure comprising a stiffened panel according to claim 7.

12. A kit of parts arranged to be assembled to form a stiffened panel according to claim 7.

13. The stiffened panel according to claim 7, wherein each stiffener comprises, or consists essentially of, a metal or a composite material.

14. The stiffened panel according to claim 7, wherein one or more of the stiffeners are formed integrally with the panel body.

15. The stiffened panel according to claim 7, wherein all of the stiffeners are formed integrally with the panel body.

16. A stiffened panel comprising: a panel body; a plurality of perpendicular stiffeners arranged on the panel body; and a one-piece fitting comprising a fitting body fastened to two or more of the perpendicular stiffeners, there being a gap between the two or more perpendicular stiffeners, whereby the fitting body spans the gap and provides, in use, a junction to transfer load between the two or more perpendicular stiffeners, wherein the fitting body overlaps each of the two or more perpendicular stiffeners and overlaps an end portion of at least one of the two or more perpendicular stiffeners, wherein the fitting body is fastened to the perpendicular stiffeners and the panel body by a plurality of mechanical fasteners.

17. The stiffened panel according to claim 16, wherein the fitting body further comprises an integral functional fitting for engagement with a component other than the stiffened panel.

18. The stiffened panel according to claim 16, wherein the fitting body comprises a recessed portion configured to be located, in use, in the gap between the two or more stiffeners.

* * * * *